US010082916B2

(12) United States Patent
Kim et al.

(10) Patent No.: US 10,082,916 B2
(45) Date of Patent: Sep. 25, 2018

(54) CIRCUIT FOR CANCELLING OFFSET CAPACITANCE OF CAPACITIVE TOUCH SCREEN PANEL AND DEVICE INCLUDING THE SAME

(71) Applicant: SAMSUNG ELECTRONICS CO., LTD., Suwon-si, Gyeonggi-Do (KR)

(72) Inventors: Bum Soo Kim, Seoul (KR); Jun Chul Park, Daegu (KR); Hyun Kyu Ouh, Yongin-si (KR); Cha Dong Kim, Gwacheon-si (KR); San Ho Byun, Bucheon-si (KR); Jin Chul Lee, Seoul (KR); Yoon Kyung Choi, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 252 days.

(21) Appl. No.: 15/201,532

(22) Filed: Jul. 4, 2016

(65) Prior Publication Data
US 2017/0010717 A1 Jan. 12, 2017

(30) Foreign Application Priority Data

Jul. 8, 2015 (KR) ........................ 10-2015-0096926
Jul. 16, 2015 (KR) ........................ 10-2015-0101003

(51) Int. Cl.
*G06F 3/041* (2006.01)
*G06F 3/044* (2006.01)

(52) U.S. Cl.
CPC ............ *G06F 3/044* (2013.01); *G06F 3/0418* (2013.01)

(58) Field of Classification Search
CPC . G06F 3/044; G06F 3/04; G06F 3/041; G01R 27/26; G01D 5/24
See application file for complete search history.

(56) References Cited

U.S. PATENT DOCUMENTS

| | | | |
|---|---|---|---|
| 8,830,207 B1 | 9/2014 | Joharapurkar et al. | |
| 8,860,432 B2 | 10/2014 | Shen et al. | |
| 8,952,927 B2 | 2/2015 | Hanssen et al. | |
| 9,658,728 B2 * | 5/2017 | Kanazawa | G06F 3/044 |
| 2011/0242048 A1 * | 10/2011 | Guedon | G06F 3/044 |
| | | | 345/174 |
| 2011/0309235 A1 * | 12/2011 | Yoshida | H03M 1/1023 |
| | | | 250/208.1 |
| 2012/0218222 A1 | 8/2012 | Shen et al. | |
| 2013/0141372 A1 | 6/2013 | Kang | |
| 2013/0211757 A1 * | 8/2013 | Miyamoto | G06F 3/0416 |
| | | | 702/65 |
| 2014/0021966 A1 | 1/2014 | Shahrokhi et al. | |
| 2014/0145997 A1 | 5/2014 | Tiruvuru | |

(Continued)

FOREIGN PATENT DOCUMENTS

KR 1266289 B1 5/2013
KR 1354674 B1 1/2014

*Primary Examiner* — Pegeman Karimi
(74) *Attorney, Agent, or Firm* — Volentine, Whitt & Francos, PLLC

(57) ABSTRACT

A touch screen controller for cancelling an offset capacitance of a capacitive touch screen panel includes a code generator configured to generate a time-invariant digital code and a time-variant digital code during an offset cancellation time. A switched-capacitor array converts the time-invariant digital code and the time-variant digital code into an amount of electric charges corresponding to the offset capacitance.

20 Claims, 13 Drawing Sheets

(56) References Cited

U.S. PATENT DOCUMENTS

| | | |
|---|---|---|
| 2014/0176489 A1 | 6/2014 | Park |
| 2014/0375609 A1 | 12/2014 | Kim |
| 2015/0077386 A1 | 3/2015 | Huang et al. |
| 2015/0084876 A1 | 3/2015 | Schwartz |
| 2016/0098117 A1* | 4/2016 | Ouh ............. G06F 3/044 345/174 |

* cited by examiner

FIG. 10

TABLE

| Sensing Element | CCODE | TCODE |
|---|---|---|
| SE11 | CCODE11 | TCODE11 |
| SE21 | CCODE21 | TCODE21 |
| ⋮ | ⋮ | ⋮ |
| SEn1 | CCODEn1 | TCODEn1 |
| SE12 | CCODE12 | TCODE12 |
| SE22 | CCODE22 | TCODE22 |
| ⋮ | ⋮ | ⋮ |
| SEn2 | CCODEn2 | TCODEn2 |
| ⋮ | ⋮ | ⋮ |
| SE1m | CCODE1m | TCODE1m |
| SE2m | CCODE2m | TCODE2m |
| ⋮ | ⋮ | ⋮ |
| SEnm | CCODEnm | TCODEnm |

CIRCUIT FOR CANCELLING OFFSET CAPACITANCE OF CAPACITIVE TOUCH SCREEN PANEL AND DEVICE INCLUDING THE SAME

CROSS-REFERENCE TO RELATED APPLICATIONS

This application claims priority under 35 U.S.C. § 119 to Korean Patent Application Nos. 10-2015-0096926, filed Jul. 8, 2015, and 10-2015-0101003, filed Jul. 16, 2015, in the Korean Intellectual Property Office (KIPO), the entire contents of which are incorporated herein by reference.

BACKGROUND

Embodiments of the disclosure relate to a semiconductor device, and more particularly, to a circuit for cancelling offset capacitance of a touch sensor of a capacitive touch screen panel and devices including the same.

Capacitive touch screens may be largely divided into a type using a mutual-capacitance sensing method and a type using a self-capacitance sensing method. In capacitive touch screens using the mutual-capacitance sensing method, an offset capacitance is generally several picofarads (pF) and a signal capacitance is several tens of femtofarads (fF). The offset capacitance may be a capacitance of a touch sensor formed in a capacitive touch screen and the signal capacitance may be a capacitance generated by a touching object like a finger in the touch sensor.

In capacitive touch screens using the self-capacitance sensing method, an offset capacitance is generally several tens of pF and a signal capacitance is several tens of fF. In capacitive touch screens, offset capacitance is significantly larger than signal capacitance. When the offset capacitance is not cancelled, the signal capacitance may not be sensed. Accordingly, the offset capacitance exerts a large influence on the sensitivity of a capacitive touch screen.

SUMMARY

According to some embodiments of the disclosure, there is provided a touch screen controller for cancelling an offset capacitance of a capacitive touch screen panel. The touch screen controller includes a code generator configured to generate a time-invariant digital code and a time-variant digital code during an offset cancellation time. A switched-capacitor array is configured to convert the time-invariant digital code and the time-variant digital code into an amount of electric charges corresponding to the offset capacitance.

The time-invariant digital code includes a most significant bit (MSB) among bits corresponding to the offset capacitance and the time-variant digital code includes a least significant bit (LSB) among the bits.

The switched-capacitor array may include a first switched-capacitor array configured to convert the time-invariant digital code into a first portion of the amount of the charges, a second switched-capacitor array configured to convert the time-variant digital code into a second portion of the amount of the charges other than the first portion, and a summation node configured to sum up the first portion and the second portion. The first portion may be greater than the second portion.

The second switched-capacitor array may include a unit capacitor and the capacitance of the unit capacitor may be greater than an offset cancellation resolution related to the offset capacitance.

The touch screen controller may further include a capacitance-to-voltage converter configured to convert the amount of the electric charges into a voltage and an integrator connected to the capacitance-to-voltage converter. An offset cancellation resolution of the offset capacitance cancelled by the time-variant digital code may be related to an integration count of the integrator.

The switched-capacitor array may include a plurality of unit capacitors. The amount of offset capacitance cancelled by the time-variant digital code at a time may be determined according to the capacitance of one of the unit capacitors and an integration count of the integrator.

The touch screen controller may further include an analog-to-digital converter configured to convert an output signal of the integrator into a digital code and a memory configured to store the time-invariant digital code and the time-variant digital code. The code generator may store the time-invariant digital code and the time-variant digital code, which are determined when a reference digital code is the same as an output digital code of the analog-to-digital converter, in the memory.

The time-variant digital code may be related to a charge count of at least one capacitor included in the switched-capacitor array.

According to other embodiments of the disclosure, there is provided a touch screen system including a capacitive touch screen panel including a touch sensor and a touch screen controller connected to the capacitive touch screen panel. The touch screen controller includes a code generator configured to generate a time-invariant digital code and a time-variant digital code during an offset cancellation time. A switched-capacitor array is configured to convert the time-invariant digital code and the time-variant digital code into the amount of electric charges corresponding to an offset capacitance of the touch sensor.

The touch screen controller may further include a driver configured to transmit a driving signal having as many pulse sequences as an integration count of the integrator to the touch sensor during the offset cancellation time.

According to further embodiments of the disclosure, there is provided a switched-capacitor digital-to-analog converter including a first switched-capacitor array configured to convert a time-invariant digital code input during an operating time into an amount of first charges. A second switched-capacitor array is configured to convert a time-variant digital code input during the operating time into an amount of second charges. A subtraction circuit is configured to subtract the sum of the amount of the first charges and the amount of the second charges from a capacitance input through an input node.

The first switched-capacitor array may include a plurality of switched-capacitors connected to the subtraction circuit. The second switched-capacitor array may include at least one switched-capacitor connected to the subtraction circuit. A total capacitance of the plurality of switched-capacitors may be controlled based on the time-invariant digital code related to an MSB among bits corresponding to the capacitance input through the input node. A total capacitance of the at least one switched-capacitor may be controlled based on the time-variant digital code related to an LSB among the bits.

According to further embodiments of the disclosure, there is provided a touch screen controller having a plurality of switched capacitors, each of the switched capacitors selectively switched off to generate no capacitance or switched on to generate a capacitance different from the switched-on capacitance of another of the switched capacitors. A summer sums the capacitances of the switched capacitors and subtracts the sum from a capacitance provided by a touch sensor of a touch screen to generate a difference capacitance, the touch sensor capacitance including an offset capacitance. A capacitance-to-voltage converter converts the difference capacitance to a corresponding voltage for each of a plurality of clock cycles. An integrator integrates the voltages over the clock cycles to generate an integrated voltage.

BRIEF DESCRIPTION OF THE DRAWINGS

The above and other features and advantages of the disclosure will become more apparent by describing in detail exemplary embodiments thereof with reference to the attached drawings in which:

FIG. 10 is a diagram of a table which stores digital codes for cancelling offsets of touch sensors included in a touch screen panel illustrated in FIG. 1 according to some embodiments of the disclosure;

DETAILED DESCRIPTION OF THE EMBODIMENTS

Figure 1:
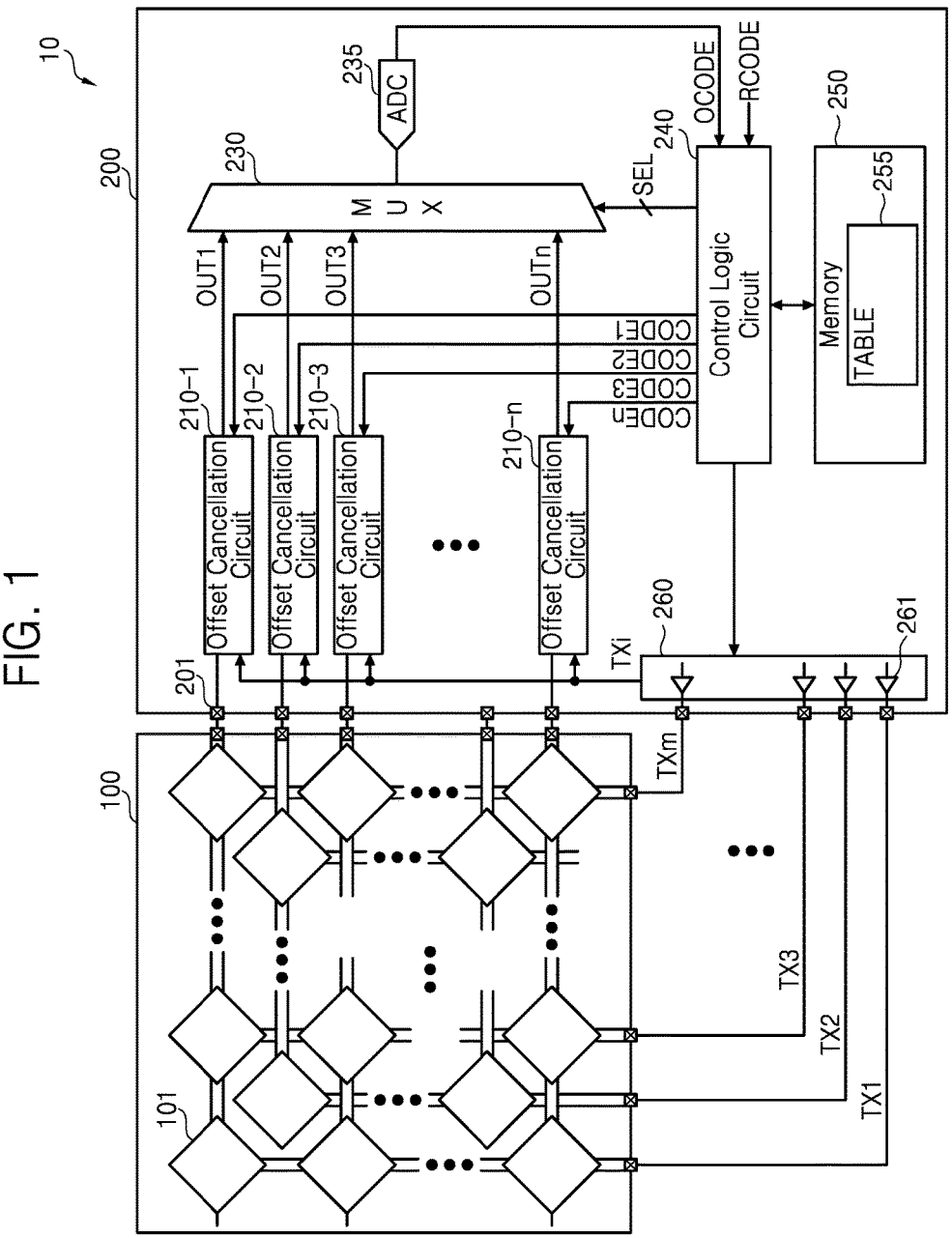
FIG. 1 is a block diagram of a touch screen system including a touch screen controller according to some embodiments of the disclosure.

The disclosure now will be described more fully hereinafter with reference to the accompanying drawings, in which embodiments of the disclosure are shown. This disclosure may, however, be embodied in many different forms and should not be construed as limited to the embodiments set forth herein. Rather, these embodiments are provided so that this disclosure will be thorough and complete, and will fully convey the scope of the disclosure to those skilled in the art.

In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

FIG. 1 is a block diagram of a touch screen system 10 including a touch screen controller 200 according to some embodiments of the disclosure. The touch screen system 10 may include a touch screen panel 100 and the touch screen controller 200. The touch screen system 10 may be a personal computer (PC) or a mobile device but is not restricted thereto. The touch screen panel 100 may be referred to as a touch screen. The mobile device may be a laptop computer, a cellular phone, a smart phone, a tablet PC, a personal digital assistant (PDA), an enterprise digital assistant (EDA), a digital still camera, a digital video camera, a portable multimedia player (PMP), a personal navigation device or portable navigation device (PND), a handheld game console, a mobile internet device (MID), a wearable computer, an internet of things (IoT) device, an internet of everything (IoE) device, a drone, or an e-book.

The touch screen panel 100 may include a plurality of sensing elements, e.g., capacitive touch sensors 101. The touch screen controller 200 may cancel an offset capacitance of the capacitive touch sensors 101 included in the touch screen panel 100. The offset capacitance may be a capacitance generated by one or more sensing elements.

Although the capacitive touch screen panel 100 using a mutual-capacitance sensing method is illustrated in FIG. 1, a method of cancelling an offset capacitance of a sensing element (such as a touch sensor) according to the disclosure is not restricted to the mutual-capacitance sensing method. For example, each capacitive touch sensor 101 may be connected to a sensing electrode which senses a touch (or a touch event) and a driving electrode which transmits a driving signal.

The touch screen controller 200 may be implemented in an integrated circuit (IC) separated from a display driver IC. The touch screen controller 200 may be merged into the display driver IC. In other words, a touch screen control block which performs the functions of the touch screen controller 200 and a display driver block which performs the functions of a display driver IC may be implemented in a single semiconductor chip.

The touch screen controller 200 may include a plurality of offset cancellation circuits 210-1 through 210-n (where "n" is a natural number of at least 4), a selection circuit 230, an analog-to-digital converter (ADC) 235, a control logic circuit 240, and a memory 250. The touch screen controller 200 may also include a driver block 260.

The offset cancellation circuits 210-1 through 210-n have the same or similar structures and perform the same or similar operations, and therefore, the structure and operations of the first offset cancellation circuit 210-1 are representatively described. An offset cancellation time may be a time during which an offset capacitance of the capacitive touch sensor 101 is cancelled in a stage of calibration or a time during which the offset capacitance of the capacitive touch sensor 101 is cancelled to process a user's touch.

When a first driver 261 included in the driver block 260 drives a first driving signal TX1 to a first driving electrode during a first offset cancellation time, the offset capacitance of capacitive touch sensors 101 connected to the first driving electrode transmitting the first driving signal TX1 may be provided for the offset cancellation circuits 210-1 through 210-n through sensing electrodes. The offset cancellation circuits 210-1 through 210-n may cancel the offset capacitance of the capacitive touch sensors 101 disposed in a first column using a method according to some embodiments of the disclosure or may generate digital codes CODE1 through CODEn, respectively, for cancelling the offset capacitance.

When a second driver included in the driver block 260 drives a second driving signal TX2 to a second driving electrode during a second offset cancellation time, the offset capacitance of capacitive touch sensors 101 connected to the second driving electrode transmitting the second driving signal TX2 may be provided for the offset cancellation circuits 210-1 through 210-n through sensing electrodes. The offset cancellation circuits 210-1 through 210-n may cancel the offset capacitance of the capacitive touch sensors 101 disposed in a second column using a method according to some embodiments of the disclosure or may generate the digital codes CODE1 through CODEn, respectively, for cancelling the offset capacitance.

When a third driver included in the driver block 260 drives a third driving signal TX3 to a third driving electrode during a third offset cancellation time, the offset capacitance of capacitive touch sensors 101 connected to the third driving electrode transmitting the third driving signal TX3 may be provided for the offset cancellation circuits 210-1 through 210-n through sensing electrodes. The offset cancellation circuits 210-1 through 210-n may cancel the offset capacitance of the capacitive touch sensors 101 disposed in a third column using a method according to some embodiments of the disclosure or may generate the digital codes CODE1 through CODEn, respectively, for cancelling the offset capacitance.

When an m-th driver included in the driver block 260 drives an m-th driving signal TXm (where "m" is a natural number of at least 4) to an m-th driving electrode during an m-th offset cancellation time, the offset capacitance of capacitive touch sensors 101 connected to the m-th driving electrode transmitting the m-th driving signal TXm may be provided for the offset cancellation circuits 210-1 through 210-n through sensing electrodes. The offset cancellation circuits 210-1 through 210-n may cancel the offset capacitance of the capacitive touch sensors 101 disposed in an m-th column using a method according to some embodiments of the disclosure or may generate the digital codes CODE1 through CODEn, respectively, for cancelling the offset capacitance.

The offset cancellation times may not overlap one another. During each of the offset cancellation times, a corresponding one of the driving signals TX1 through TXm may toggle as many times as the number of integrals performed by an integrator included in a corresponding one of the offset cancellation circuits 210-1 through 210-n. During an offset cancellation time, one of the offset cancellation circuits 210-1 through 210-n may convert a time-invariant digital code and a time-variant digital code into the amount of electric charges corresponding to the offset capacitance of one of the capacitive touch sensors 101 using a switched-capacity digital-to-analog converter (DAC) included in the one offset cancellation circuit 210-1 through 210-n in order to cancel the offset capacitance.

The selection circuit 230 may output one of output signals OUT1 through OUTn of the respective offset cancellation circuits 210-1 through 210-n to the ADC 235 in response to selection signals SEL. The selection circuit 230 may be implemented as a multiplexer, but the disclosure is not restricted to the current embodiments. In other words, the selection circuit 230 may control each of the output timings of the output signals OUT1 through OUTn of the offset cancellation circuits 210-1 through 210-n in response to the selection signals SEL.

The ADC 235 may convert each of the output signals OUT1 through OUTn into output digital signals OCODE. The output digital signals OCODE may correspond to an output digital code.

The control logic circuit 240 may include the function of a code generator which generates the digital codes CODE1 through CODEn. During a calibration operation, the control logic circuit 240 may change the digital codes CODE1 through CODEn until reference digital signals RCODE are the same as the output digital signals OCODE. Each of the digital codes CODE1 through CODEn may include a time-invariant digital code and a time-variant digital code.

The reference digital signals RCODE may correspond to a reference digital code. For example, the value of the reference digital code RCODE may be half of a value of the output digital code OCODE, but the disclosure is not restricted to the current embodiments. For example, when the output digital code OCODE is expressed as a binary number corresponding to a decimal number of 2047, the reference digital code RCODE may be expressed as a binary number corresponding to a decimal number of 1023.

The control logic circuit 240 may generate the selection signals SEL and may control the driver block 260. The control logic circuit 240 may control the generation timing and the toggling count of each of the driving signals TX1 through TXm. The control logic circuit 240 may control the operation of an integrator implemented in each of the offset cancellation circuits 210-1 through 210-n and may control the number of integrals, i.e., an integration count. The integration count may be externally programmable.

During the calibration operation, the control logic circuit 240 may output each of the digital codes CODE1 through CODEn which is determined when the reference digital code RCODE is the same as the output digital code OCODE to a corresponding one of the offset cancellation circuits 210-1 through 210-n or may store each of the digital codes CODE1 through CODEn in the memory 250. For example, the memory 250 may be static random access memory (SRAM) but is not restricted thereto.

During the calibration operation, the control logic circuit 240 may generate the digital codes CODE1 through CODEn for cancelling the offset capacitance of the capacitive touch sensors 101 disposed in each column and may store the digital codes CODE1 through CODEn in a form of a table 255 in the memory 250. The table 255 will be described in detail with reference to FIG. 10 later.

For example, during or after the calibration operation, the control logic circuit 240 may store the digital codes CODE1 through CODEn for cancelling the offset capacitance of capacitive touch sensors 101 included in the touch screen panel 100 in a non-volatile memory, e.g., a flash-based memory, placed outside the touch screen controller 200. For example, the flash-based memory may be a NAND-type flash memory or a NOR-type flash memory but is not restricted thereto.

When the touch screen controller 200 included in the touch screen system 10 is booted after the calibration operation (or after the touch screen controller 200 is manufactured to be sold in a market), the control logic circuit 240 of the touch screen controller 200 may load the digital codes CODE1 through CODEn stored in the non-volatile memory to the memory 250. When a user's touch or touch event is sensed using the touch screen system 10 including the touch screen panel 100 and the touch screen controller 200 after the calibration operation, the offset cancellation circuits 210-1 through 210-n may cancel the offset capacitance of the capacitive touch sensors 101 included in the touch screen panel 100 using the digital codes CODE1 through CODEn, respectively, loaded from the non-volatile memory to the memory 250.

Although the driver block 260 provides a driving signal TXi (where "i" is a natural number and 1≤i≤m) for each of the offset cancellation circuits 210-1 through 210-n in the embodiments illustrated in FIG. 1, the disclosure is not restricted to the current embodiments. The control logic circuit 240 may provide the driving signal TXi or information corresponding to the driving signal TXi for each of the offset cancellation circuits 210-1 through 210-n in other embodiments.

Figure 2:
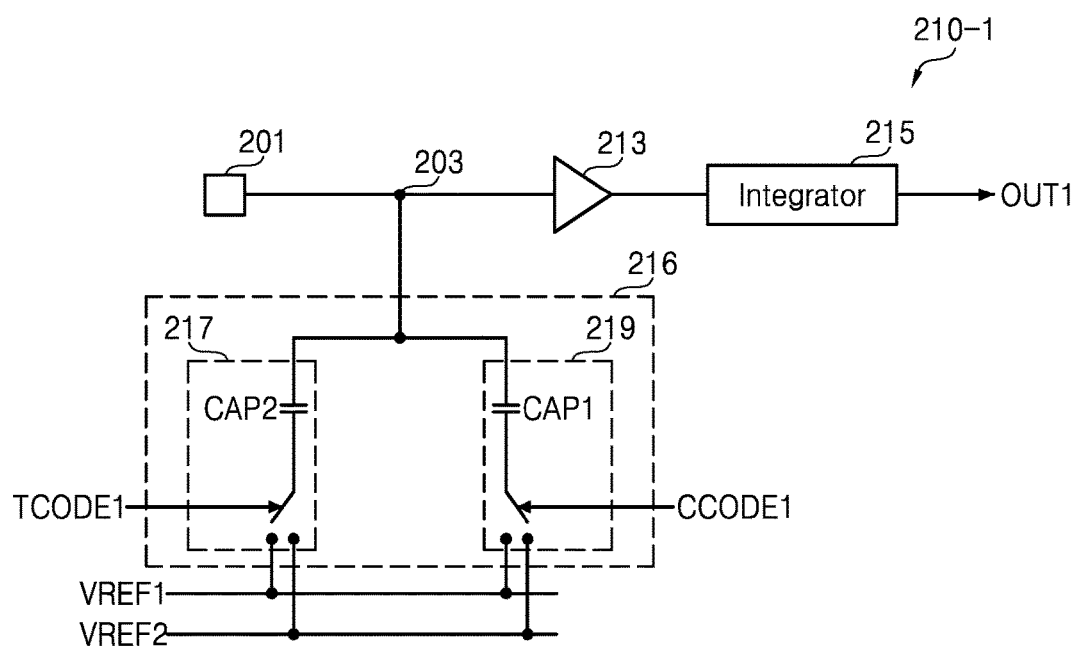
FIG. 2 is a schematic block diagram of an offset cancellation circuit illustrated in FIG. 1.

FIG. 2 is a schematic block diagram of the offset cancellation circuit 210-1 illustrated in FIG. 1. The offset cancellation circuits 210-1 through 210-n have the same or similar structures and perform the same or similar operations, and therefore, the first offset cancellation circuit 210-1 is representatively illustrated.

The first offset cancellation circuit 210-1 may receive the offset capacitance (or a signal corresponding to the offset capacitance) of each of capacitive touch sensors 101 arranged in a first row of the touch screen panel 100 through an input pad (or an input node) 201 at a different time (or during a different offset cancellation time).

A node 203 may perform the function of an addition circuit (or an adder) or a subtraction circuit (or a subtractor). For example, from the view point of a switched-capacitor DAC 216, the node 203 may perform the function of a summation circuit (or a summation node) which sums up the amount of first electric charges corresponding to a time-invariant digital code CCODE1 and the amount of second electric charges corresponding to a time-variant digital code TCODE1. However, from the view point of the cancellation of offset capacitance, the node 203 may perform the function of a subtraction circuit (or a subtraction node) which subtracts the sum of the amount of the first electric charges and the amount of second electric charges from the offset capacitance.

The first offset cancellation circuit 210-1 may include the input pad 201 connected to a sensing electrode of the touch screen panel 100, the node 203, a buffer 213, an integrator 215, and the switched-capacitor DAC 216.

The buffer 213 may perform the function of a capacitance-to-voltage converter which converts the capacitance of the node 203 (or capacitance generated by the node 203) into a voltage (or a voltage signal). The integrator 215 may integrate (or accumulate) a voltage output from the buffer 213. For example, the integrator 215 may perform at least two times of integration according to the control of the control logic circuit 240. For example, the control logic circuit 240 may control the integration count of the integrator 215.

The switched-capacitor DAC 216 may convert the time-invariant digital code CCODE1 and the time-variant digital code TCODE1 into the amount of electric charges. The amount of electric charges may include a first portion and a second portion and the first portion may be greater than the second portion.

For example, the switched-capacitor DAC 216 may include a first switched-capacitor array 219 which converts the time-invariant digital code CCODE1 into the first portion (e.g., the amount of first electric charges) and a second switched-capacitor array 217 which converts the time-variant digital code TCODE1 into the second portion (e.g., the amount of second electric charges). The switched-capacitor DAC 216 may be a switched-capacitor array.

The control logic circuit 240 may generate the time-invariant digital code CCODE1 for controlling the first portion (i.e., a portion corresponding to the first switched-capacitor array 219) including the most significant bit (MSB) among bits corresponding to the offset capacitance and the time-variant digital code TCODE1 for controlling the second portion (i.e., a portion corresponding to the second switched-capacitor array 217) including the least significant bit (LSB) among the bits.

The time-invariant digital code CCODE1 may always be used to cancel the first portion of the offset capacitance regardless of an offset cancellation time. The time-variant digital code TCODE1 may include a digital signal (e.g., one of logic 1 and logic 0) for cancelling the remaining second portion of the offset capacitance in association with the offset cancellation time or may include a digital signal (e.g., the other one of logic 1 and logic 0) for not cancelling the remaining second portion. For example, the time-invariant digital code CCODE1 may be parallel digital signals and the time-variant digital code TCODE1 may be at least one serial digital signal, but the disclosure is not restricted to the current embodiments.

When the first switched-capacitor array 219 is connected to a first transmission line for transmitting a first reference voltage VREF1 in response to the time-invariant digital code CCODE1, the first switched-capacitor array 219 may perform a charging operation (i.e., an operation of increasing the amount of first electric charges). When the first switched-capacitor array 219 is connected to a second transmission line for transmitting a second reference voltage VREF2 in response to the time-invariant digital code CCODE1, the first switched-capacitor array 219 may perform a discharging operation (i.e., an operation of decreasing the amount of first electric charges). In some embodiments, the first switched-capacitor array 219 may perform an operation opposite to the above-described operation.

When the second switched-capacitor array 217 is connected to the first transmission line for transmitting the first reference voltage VREF1 in response to the time-variant digital code TCODE1, the second switched-capacitor array 217 may perform a charging operation (i.e., an operation of increasing the amount of second electric charges). When the second switched-capacitor array 217 is connected to the second transmission line for transmitting the second reference voltage VREF2 in response to the time-variant digital code TCODE1, the second switched-capacitor array 217 may perform a discharging operation (i.e., an operation of decreasing the amount of second electric charges). In some embodiments, the second switched-capacitor array 217 may perform an operation opposite to the above-described operation.

For example, the first reference voltage VREF1 may be higher than the second reference voltage VREF2. For example, the second reference voltage VREF2 may be a ground voltage but is not restricted thereto.

Figure 3:
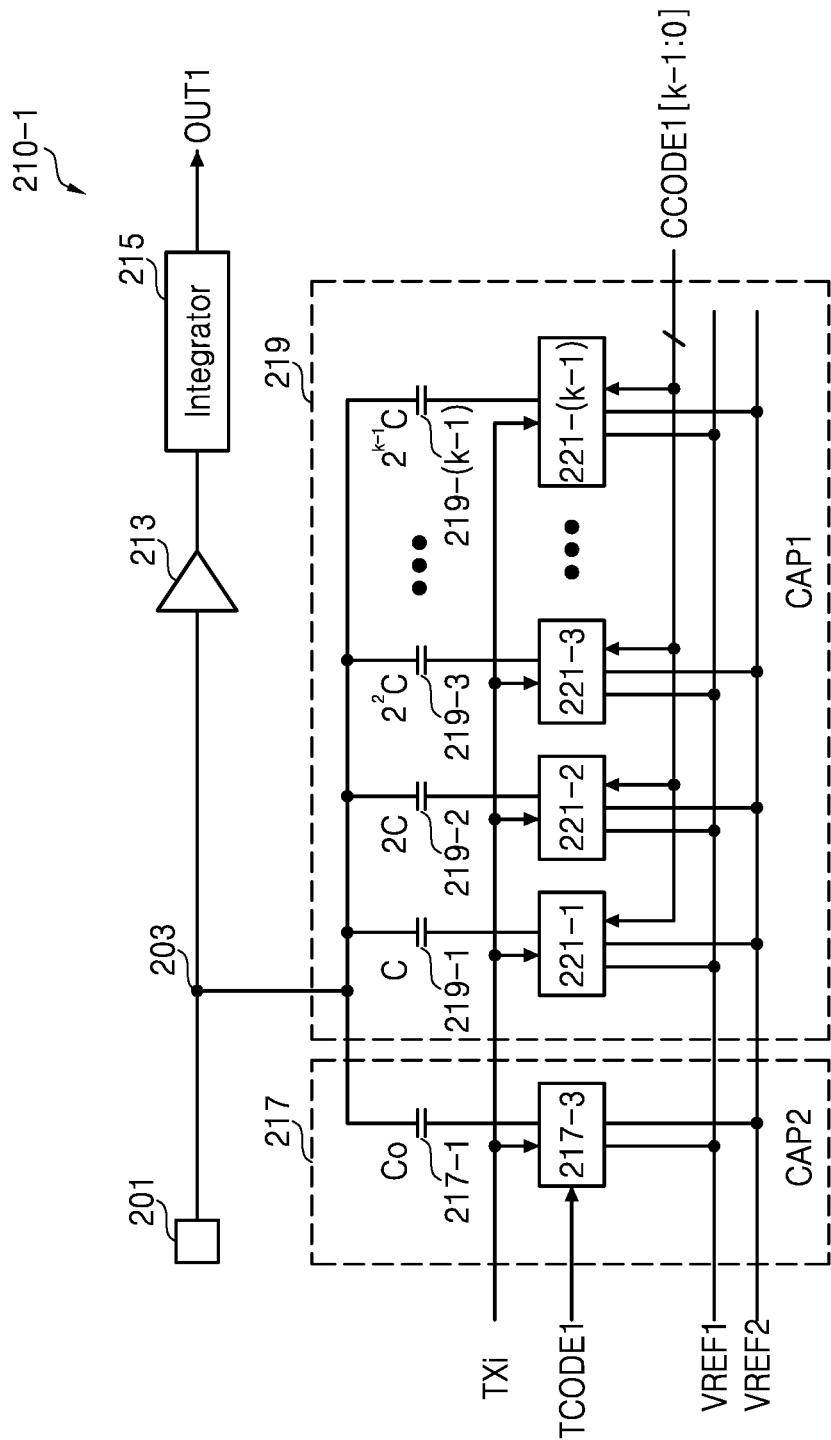
FIG. 3 is a detailed block diagram of the offset cancellation circuit illustrated in FIG. 1.

Although the first switched-capacitor array 219 operates in response to the time-invariant digital code CCODE1 and the second switched-capacitor array 217 operates in response to the time-variant digital code TCODE1 in the embodiments illustrated in FIG. 2, the first switched-capacitor array 219 may operate in response to the combination of the time-invariant digital code CCODE1 and a first control signal (e.g., TXi in FIG. 3) and the second switched-capacitor array 217 may operate in response to the time-variant digital code TCODE1 and a second control signal (e.g., TXi in FIG. 3). For example, the first control signal and the second control signal may be the same as or different from each other.

FIG. 3 is a detailed block diagram of the offset cancellation circuit 210-1 illustrated in FIG. 1. Referring to FIGS. 2 and 3, the first switched-capacitor array 219 may include a plurality of capacitors 219-1 through 219-($k$–1) (where "k" is a natural number of at least 5) and a plurality of switch control circuits 221-1 through 221-($k$–1).

A single switched-capacitor may include one capacitor and one switch control circuit. In other words, each switched-capacitor may include one of the capacitors 219-1 through 219-($k$–1) and one of the switch control circuits 221-1 through 221-($k$–1). Each of the switch control circuits 221-1 through 221-($k$–1) may be connected to the first transmission line for transmitting the first reference voltage VREF1 or the second transmission line for transmitting the second reference voltage VREF2 in response to a corresponding one bit among k-bits included in the time-invariant digital code CCODE1[$k$–1:0] and the driving signal TXi. The capacitance of each of the capacitors 219-1 through 219-($k$–1) may be a weighted value, as shown in FIG. 3.

The second switched-capacitor array 217 may include a capacitor 217-1 and a switch control circuit 217-3. For example, a capacitance Co of the capacitor 217-1 and a capacitance C of the capacitor 219-1 may be the same as each other to secure linearity, but they may be designed to be different from each other.

A switched-capacitor may include the capacitor 217-1 and the switch control circuit 217-3. The switch control circuit 217-3 may be connected to the first transmission line for transmitting the first reference voltage VREF1 or the second transmission line for transmitting the second reference voltage VREF2 in response to the driving signal TXi and to a digital signal, which is included in the time-variant digital code TCODE1 and varies with time. For example, the time-variant digital code TCODE1 may include information about the number of connections between the capacitor 217-1 and the first transmission line for transmitting the first reference voltage VREF1.

Figure 4:
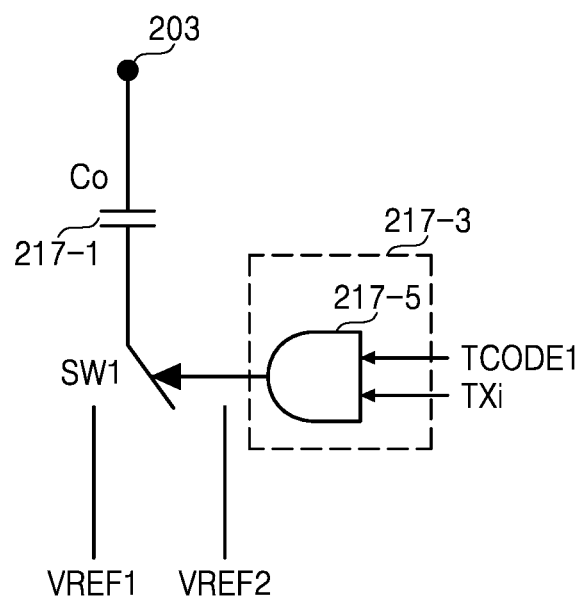
FIG. 4 is a diagram of a switch control circuit included in a second switched-capacity array illustrated in FIG. 3 according to some embodiments of the disclosure.

FIG. 4 is a diagram of the switch control circuit 217-3 included in the second switched-capacity array 217 illustrated in FIG. 3 according to some embodiments of the disclosure. Referring to FIGS. 3 and 4, the switch control circuit 217-3 may include a mask circuit 217-5. For example, the mask circuit 217-5 may control the transmission of the driving signal TXi based on the time-variant digital code TCODE1. For example, the mask circuit 217-5 may be implemented as an AND gate, but the disclosure is not restricted to the current embodiments. A switch SW1 may connect the capacitor 217-1 to the first transmission line for transmitting the first reference voltage VREF1 or the second transmission line for transmitting the second reference voltage VREF2 in response to an output signal of the switch control circuit 217-3.

Figure 5:
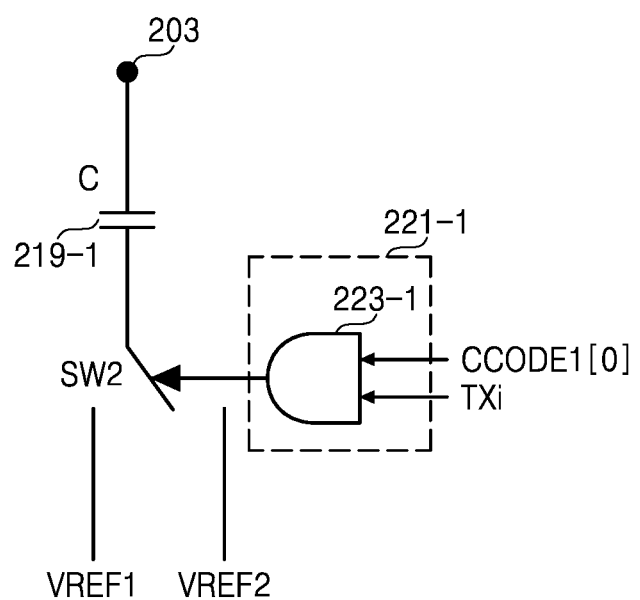
FIG. 5 is a diagram of a switch control circuit included in a first switched-capacity array illustrated in FIG. 3 according to some embodiments of the disclosure.

FIG. 5 is a diagram of the switch control circuit 221-1 included in the first switched-capacity array 219 illustrated in FIG. 3 according to some embodiments of the disclosure. Referring to FIGS. 3 and 5, the switch control circuit 221-1 may include a mask circuit 223-1. For example, the mask circuit 223-1 may control the transmission of the driving signal TXi based on the LSB CCODE1[0] among the k-bits included in the time-invariant digital code CCODE1[$k$–1:0]. For example, the mask circuit 223-1 may be implemented as an AND gate, but the disclosure is not restricted to the current embodiments. For example, a switch SW2 may connect the capacitor 219-1 to the first transmission line for transmitting the first reference voltage VREF1 or the second transmission line for transmitting the second reference voltage VREF2 in response to an output signal of the switch control circuit 221-1.

Figure 6:
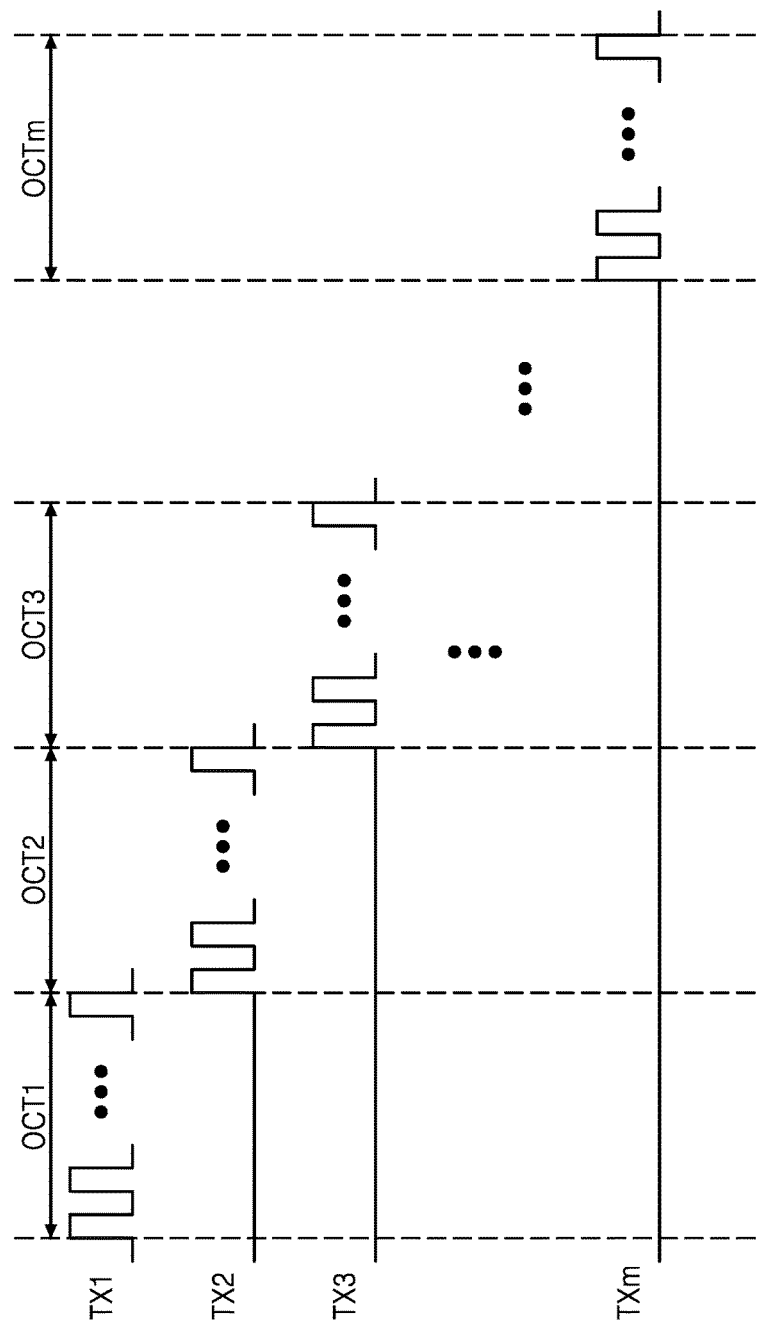
FIG. 6 is a waveform diagram of driving signals corresponding to an integration count according to some embodiments of the disclosure.

FIG. 6 is a waveform diagram of the driving signals TX1 through TXm corresponding to an integration count according to some embodiments of the disclosure. During each of offset cancellation times OCT1 through OCTm, a corresponding one of the driving signals TX1 through TXm toggles as many times as the integration count of the integrator 215 included in a corresponding one of the offset cancellation circuits 210-1 through 210-$n$. It is assumed that one toggling is a single period of the driving signal TXi. For example, when the integration count is 4, the driving signal TXi may toggles four times during the first offset cancellation time OCT1. In other words, the driving signal TXi may have four pulse sequences.

Figure 7:
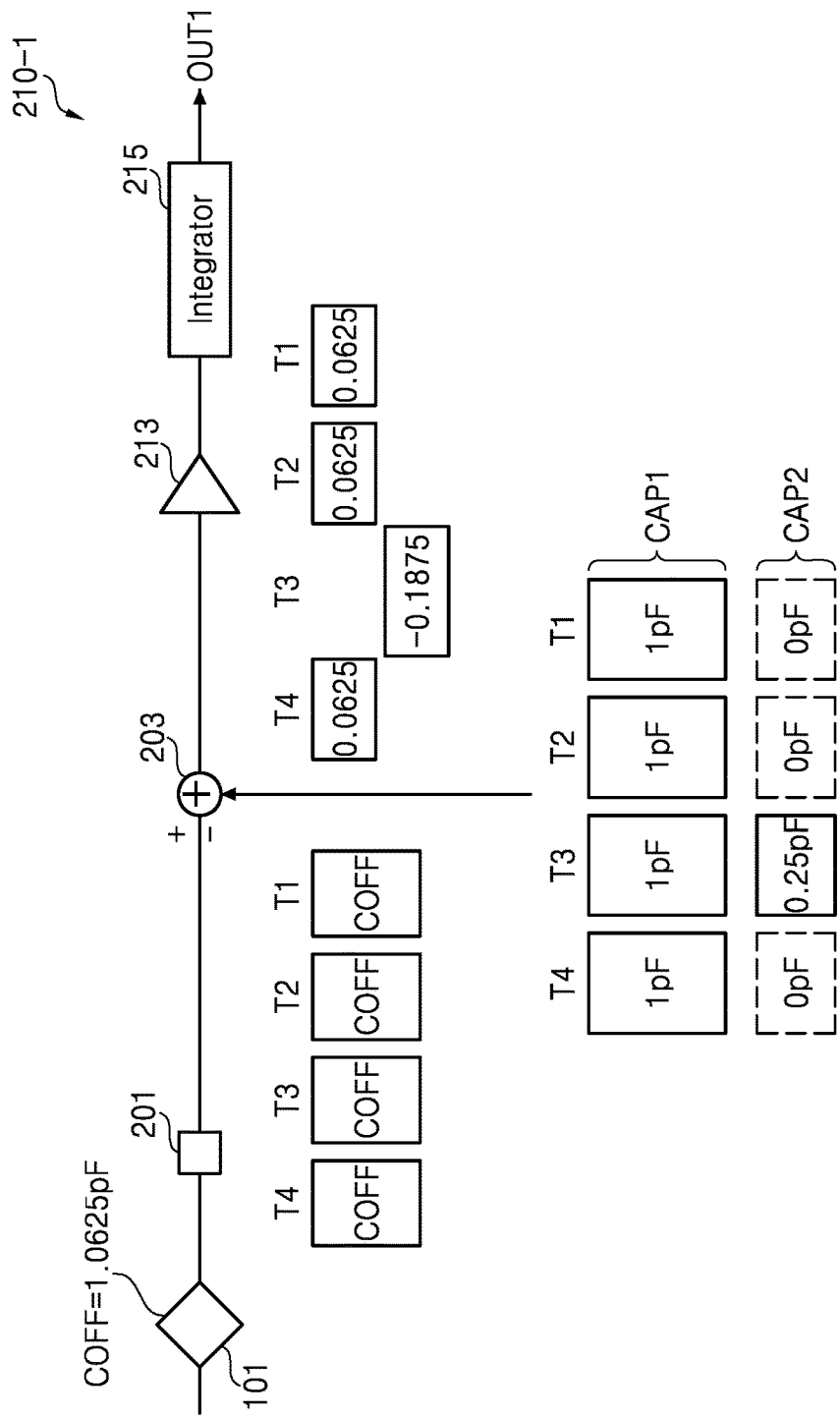
FIG. 7 is a conceptual diagram of a method of cancelling an offset capacitance of a touch sensor of a touch screen panel according to some embodiments of the disclosure.
Figure 8:
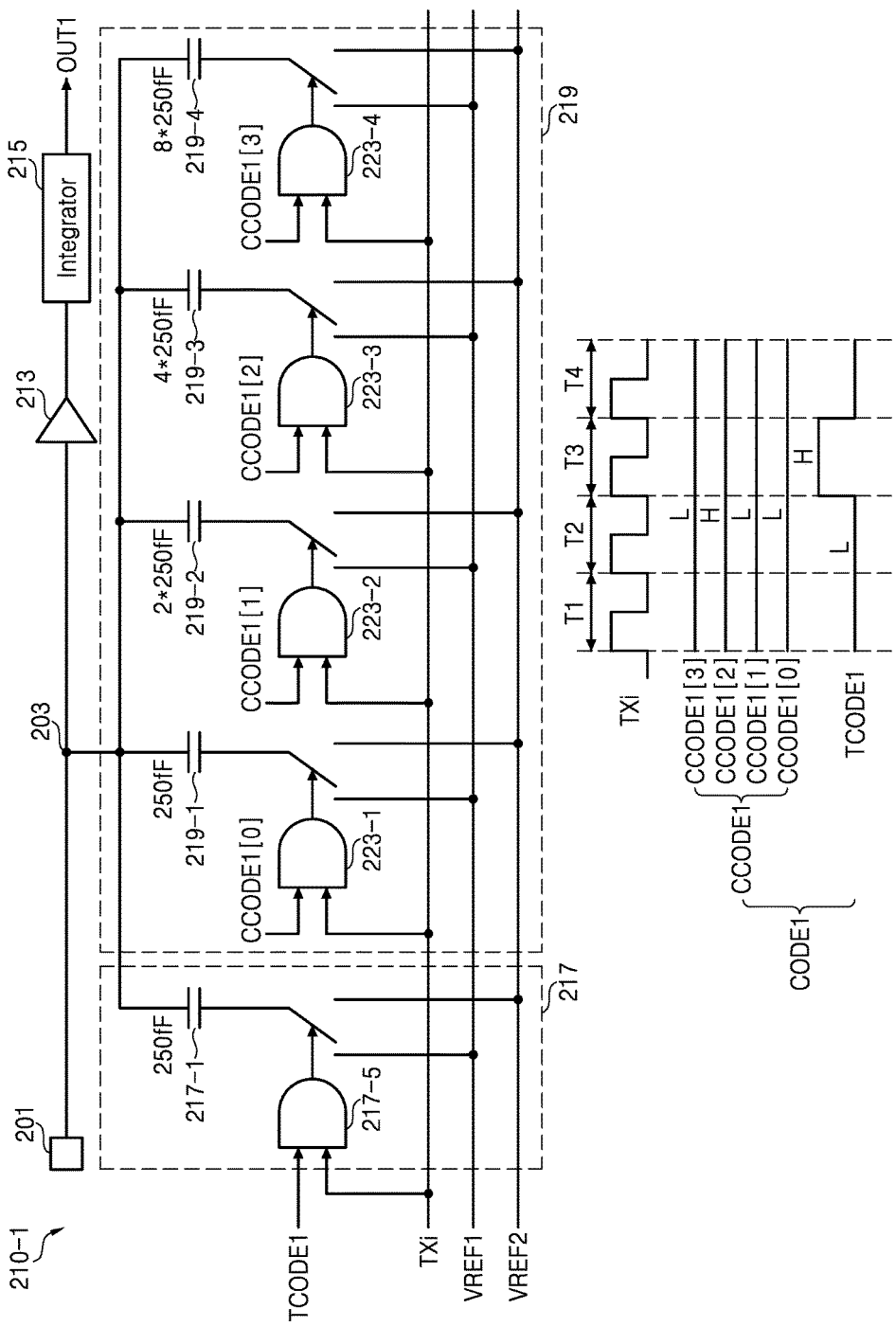
FIG. 8 is a diagram of an offset cancellation circuit for performing the offset cancellation method illustrated in FIG. 7 according to some embodiments of the disclosure.
Figure 9:
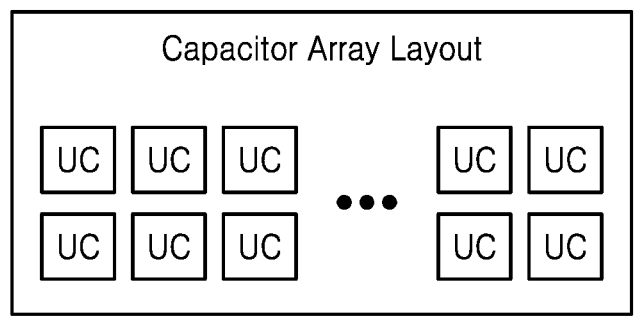
FIG. 9 is a diagram of a capacitor array layout included in an offset cancellation circuit according to some embodiments of the disclosure.

FIG. 7 is a conceptual diagram of a method of cancelling an offset capacitance of a touch sensor of a touch screen panel according to some embodiments of the disclosure. FIG. 8 is a diagram of the offset cancellation circuit 210-1 for performing the offset cancellation method illustrated in FIG. 7 according to some embodiments of the disclosure. FIG. 9 is a diagram of a capacitor array layout included in an offset cancellation circuit according to some embodiments of the disclosure.

Although specific numbers are shown in FIGS. 7 and 8, they are just examples. It is assumed that an offset capacitance COFF of a capacitive touch sensor 101 is 1.0625 pF, the capacitance of each of the capacitors 217-1 and 219-1 is 250 fF, a capacitance of the capacitor 219-2 is 500 fF, a capacitance of the capacitor 219-3 is 1 pF, and a capacitance of the capacitor 219-4 is 2 pF. It is also assumed that the time-invariant digital code CCODE1[3:0] is 4b0100 (i.e., 4-bit binary code 0100); the time-variant digital code TCODE1 varies from L(=0) to L(=0), to H(=1), and then to L(=0) with periods T1, T2, T3, and T4; and the integration count of the integrator 215 is four.

It is also assumed that each of the capacitors 217-1, 219-1, 219-2, 219-3, and 219-4 is connected to the second transmission line for transmitting the second reference voltage VREF2 when an output signal of a corresponding one of AND gates 217-5, 223-1, 223-2, 223-3, and 223-4 is at a low level L; and each of the capacitors 217-1, 219-1, 219-2, 219-3, and 219-4 is connected to the first transmission line for transmitting the first reference voltage VREF1 when the output signal of the corresponding one of the AND gates 217-5, 223-1, 223-2, 223-3, and 223-4 is at a high level H.

During an offset cancellation time, i.e., a calibration time from the first period T1 to the fourth period T4, the offset cancellation circuit 210-1 may change the first digital code CODE1 until the reference digital code RCODE is the same as the output digital code OCODE and cancel the offset capacitance COFF of the capacitive touch sensor 101.

It is assumed that when the reference digital code RCODE is the same as the output digital code OCODE, the time-invariant digital code CCODE1[3:0] is 4b0100 and the time-variant digital code TCODE1 varies with the periods T1 through T4, as shown in FIG. 8.

In the first period T1, the time-invariant digital code CCODE1[3:0] (=4b0100) is input to the first switched-capacity array 219 and the time-variant digital code TCODE1 (=0) is input to the second switched-capacity array 217. Accordingly, the node 203 outputs a first difference of 0.0625 pF between the offset capacitance COFF (=1.0625 pF) and a capacitance CAP1 (=1 pF) of the first switched-capacity array 219. The buffer 213 outputs a first voltage corresponding to the first difference and the integrator 215 accumulates the first voltage for the first output voltage OUT1.

In the second period T2, the time-invariant digital code CCODE1[3:0] (=4b0100) is input to the first switched-capacity array 219 and the time-variant digital code TCODE1 (=0) is input to the second switched-capacity array 217. Accordingly, the node 203 outputs a second difference of 0.0625 pF between the offset capacitance COFF (=1.0625 pF) and the capacitance CAP1 (=1 pF) of the first switched-capacity array 219. The buffer 213 outputs a second voltage corresponding to the second difference and the integrator 215 accumulates the first voltage and the second voltage for the first output voltage OUT1.

In the third period T3, the time-invariant digital code CCODE1[3:0] (=4b0100) is input to the first switched-capacity array 219 and the time-variant digital code TCODE1 (=1) is input to the second switched-capacity array 217. Accordingly, the node 203 outputs a third difference (i.e., 1.0625−(1+0.25)=−0.1875 pF) between the offset capacitance COFF (=1.0625 pF) and the sum of the capacitance CAP1 (=1 pF) of the first switched-capacity array 219 and a capacitance CAP2 (=0.25 pF) of the second switched-capacity array 217. The buffer 213 outputs a third voltage corresponding to the third difference and the integrator 215 accumulates the first through third voltages for the first output voltage OUT1.

In the fourth period T4, the time-invariant digital code CCODE1[3:0] (=4b0100) is input to the first switched-capacity array 219 and the time-variant digital code TCODE1 (=0) is input to the second switched-capacity array 217. Accordingly, the node 203 outputs a fourth difference of 0.0625 pF between the offset capacitance COFF (=1.0625 pF) and the capacitance CAP1 (=1 pF) of the first switched-capacity array 219. The buffer 213 outputs a fourth voltage corresponding to the fourth difference and the integrator 215 accumulates the first through fourth voltages for the first output voltage OUT1. At this time, an accumulated voltage at the integrator 215 is 0 (zero). Capacitances in the periods T1 through T4 are accumulated by the integrator 215.

When the offset capacitance COFF of the capacitive touch sensor 101 is 1.0625 pF, a conventional touch screen controller cancels the offset capacitance COFF in 0.0625 pF unit (i.e., an offset cancellation resolution). Accordingly, the capacitance of a minimum unit capacitor implemented in the conventional touch screen controller is 0.0625 pF.

However, when the capacitance Co of the capacitor 217-1 included in the second switched-capacity array 217 is 250 fF and the integration count of the integrator 215 is four, the amount of the offset capacitance COFF (i.e., an offset cancellation resolution) of the capacitive touch sensor 101 which can be cancelled by the touch screen controller 200 according to some embodiments of the disclosure may be 62.5 fF (=250 fF/4).

In other words, even when the capacitance of a unit capacitor UC implemented in the touch screen controller 200 is 250 fF, the offset cancellation resolution of the touch screen controller 200 may be 62.5 fF. When the integration count of the integrator 215 is set to 100, the offset cancellation resolution of the touch screen controller 200 may be 2.5 fF (=250 fF/100).

Consequently, even when a unit capacitor UC having a capacitance of 250 fF instead of a minimum unit capacitor having a capacitance of 2.5 fF is implemented in the touch screen controller 200, the touch screen controller 200 can cancel the offset capacitance COFF using the offset cancellation resolution of about 2.5 fF. In other words, manufactures can manufacture a unit capacitor having a large capacitance (e.g., 250 fF) without any restriction on the capacitance (e.g., 2.5 fF) of a minimum unit capacitor during the manufacturing and the touch screen controller 200 can cancel the offset capacitance COFF using an offset cancellation resolution (e.g., 2.5 fF) less than the capacitance (e.g., 250 fF) of the unit capacitor UC.

The offset cancellation resolution of the touch screen controller 200 may be adjusted based on the integration count of the integrator 215. The offset cancellation resolution of the touch screen controller 200 may be related with the integration count of the integrator 215 included in each of the offset cancellation circuits 210-1 through 210-n. In other words, the offset cancellation resolution of the touch screen controller 200 may be determined according to the integration count of the integrator 215 included in each of the offset cancellation circuits 210-1 through 210-n and the capacitance of the unit capacitor UC included in each of the offset cancellation circuits 210-1 through 210-n.

The time-variant digital code TCODE1 may include information corresponding to the number of charging operations, i.e., a charge count of the capacitor 217-1. Since the charge count of the capacitor 217-1 in the above-described embodiments is 1, the time-variant digital code TCODE1 is at a high level H in only one period among the periods T1 through T4.

In some embodiments, the switch control circuit 217-3 illustrated in FIG. 3 may control the charge count in response to the time-variant digital code TCODE1 related with the charge count of the capacitor 217-1. For example, when the time-variant digital code TCODE1 is four bits and the charge count is two, the time-variant digital code TCODE1 may be 4b0110. When the time-variant digital code TCODE1 is four bits and the charge count is four, the time-variant digital code TCODE1 may be 4b1111.

FIG. 10 is a diagram of a table which stores digital codes for cancelling offsets of touch sensors included in the touch screen panel 100 illustrated in FIG. 1 according to some embodiments of the disclosure. Referring to FIGS. 1 and 10, the control logic circuit 240 may generate a digital code for sensing elements, e.g., capacitive touch sensors in each column and may store digital codes in the form of the table 255 in the memory 250. Each digital code may include the time-invariant digital code CCODE and the time-variant digital code TCODE.

When n*m sensing elements are formed in the touch screen panel 100, a reference character SE21 denotes a sensing element placed at a second row and a first column, a reference character CCODE21 denotes a time-invariant digital code for the sensing element SE21, and a reference character TCODE21 denotes a time-variant digital code for the sensing element SE21.

Figure 11:
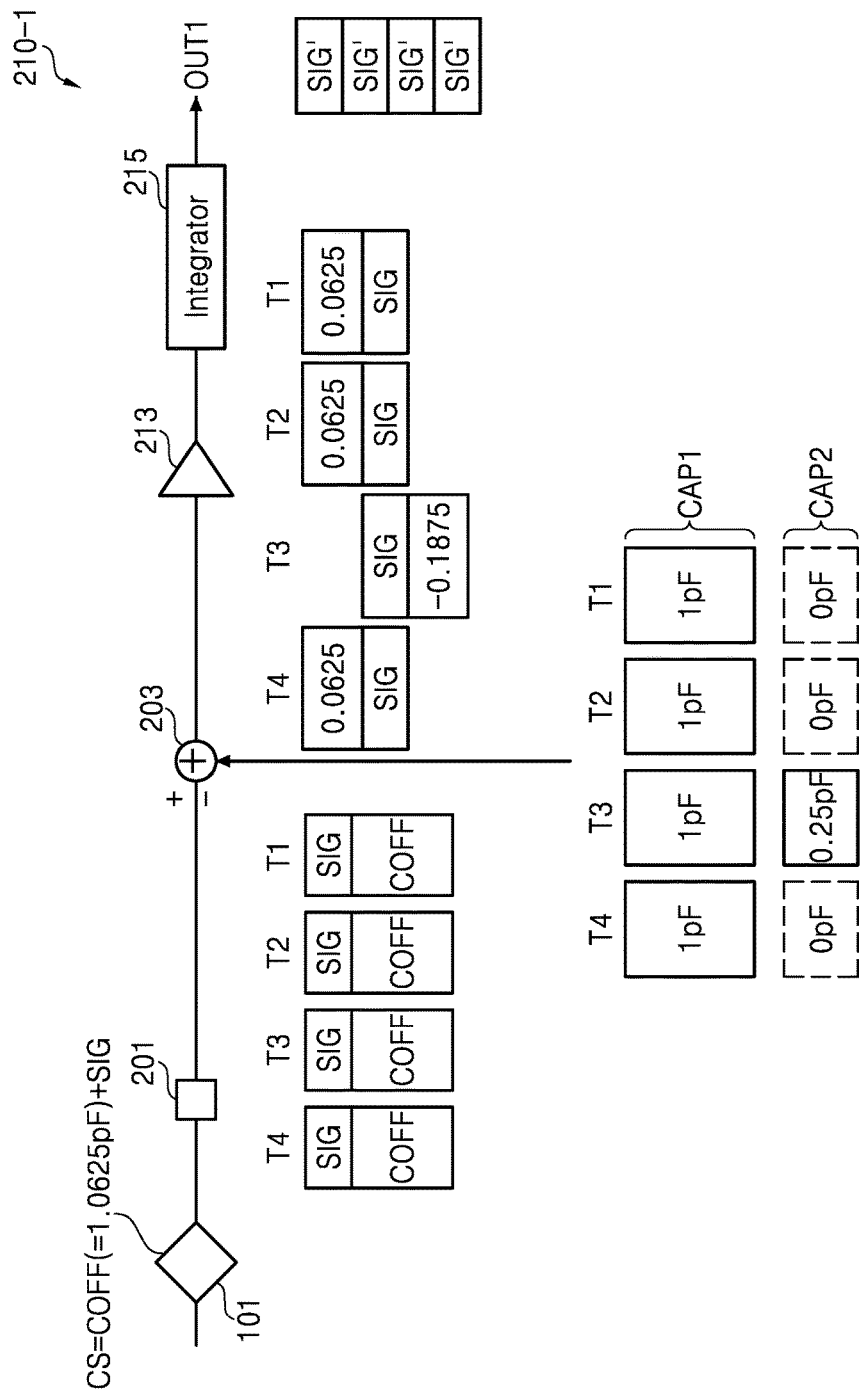
FIG. 11 is a conceptual diagram of a procedure for processing a touch using the offset cancellation circuit illustrated in FIG. 1 according to some embodiments of the disclosure.

FIG. 11 is a conceptual diagram of a procedure for processing a touch using the first offset cancellation circuit 210-1 illustrated in FIG. 1 according to some embodiments of the disclosure. The procedure for processing a touch using the first offset cancellation circuit 210-1 will be described with reference to FIGS. 7, 8, and 11. It is assumed that the time-invariant digital code CCODE1[3:0] for the first offset cancellation circuit 210-1 is set to 4b0100 and the time-variant digital code TCODE1 varies with the periods T1 through T4, as shown in FIG. 8, through the calibration operation described with reference to FIG. 7.

When a touch sensor 101 of the touch screen panel 100 is touched with a user's finger, the capacitance of the touch sensor 101 may be changed by the touch. At this time, it is assumed that the offset capacitance COFF is the capacitance of the touch sensor 101 and a signal capacitance SIG is a capacitance related with the touch sensor 101 changed by the touch. A total capacitance CS is assumed to be the sum of the offset capacitance COFF and the signal capacitance SIG.

When the time-invariant digital code CCODE1[3:0] (=4b0100) is input to the first switched-capacity array 219 and the time-variant digital code TCODE1 (=0) is input to the second switched-capacity array 217 in the first period T1, the node 203 outputs a first difference, i.e., SIG+0.0625 pF, between the total capacitance CS (=COFF(=1.0625 pF)+SIG) and the capacitance CAP1 (=1 pF) of the first switched-capacity array 219. The buffer 213 outputs a first voltage corresponding to the first difference and the integrator 215 accumulates the first voltage for the first output voltage OUT1.

When the time-invariant digital code CCODE1[3:0] (=4b0100) is input to the first switched-capacity array 219 and the time-variant digital code TCODE1 (=0) is input to the second switched-capacity array 217 in the second period T2, the node 203 outputs a second difference, i.e., SIG+0.0625 pF, between the total capacitance CS (=COFF(=1.0625 pF)+SIG) and the capacitance CAP1 (=1 pF) of the first switched-capacity array 219. The buffer 213 outputs a second voltage corresponding to the second difference and the integrator 215 accumulates the first and second voltages for the first output voltage OUT1.

When the time-invariant digital code CCODE1[3:0] (=4b0100) is input to the first switched-capacity array 219 and the time-variant digital code TCODE1 (=1) is input to the second switched-capacity array 217 in the third period T3, the node 203 outputs a third difference, i.e., SIG+ 0.0625−(1+0.25)=−SIG−0.1875 pF, between the total capacitance CS (=COFF(=1.0625 pF)+SIG) and the sum of the capacitance CAP1 (=1 pF) of the first switched-capacity array 219 and the capacitance CAP2 (=0.25 pF) of the second switched-capacity array 217. The buffer 213 outputs a third voltage corresponding to the third difference and the integrator 215 accumulates the first through third voltages for the first output voltage OUT1.

When the time-invariant digital code CCODE1[3:0] (=4b0100) is input to the first switched-capacity array 219 and the time-variant digital code TCODE1 (=0) is input to the second switched-capacity array 217 in the fourth period T4, the node 203 outputs a fourth difference, i.e., SIG+ 0.0625 pF, between the total capacitance CS (=COFF (=1.0625 pF)+SIG) and the capacitance CAP1 (=1 pF) of the first switched-capacity array 219. The buffer 213 outputs a fourth voltage corresponding to the fourth difference and the integrator 215 accumulates the first through fourth voltages for the first output voltage OUT1.

At this time, an accumulated voltage at the integrator 215, i.e., a voltage corresponding to the signal capacitance SIG is 4*SIG'. The voltage SIG' corresponding to the signal capacitance SIG in each of the periods T1 through T4 is accumulated by the integrator 215. Accordingly, the first offset cancellation circuit 210-1 cancels the offset capacitance COFF by 62.5 fF using the unit capacitor UC having a capacitance of 250 fF.

Figure 12:
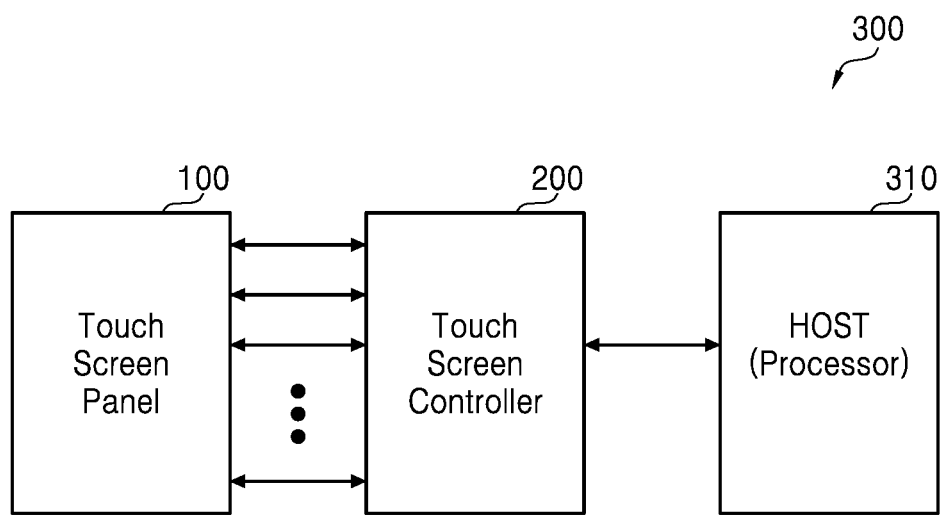
FIG. 12 is a block diagram of a touch screen system including the touch screen controller illustrated in FIG. 1 according to some embodiments of the disclosure.

FIG. 12 is a block diagram of a touch screen system 300 including the touch screen controller 200 illustrated in FIG. 1 according to some embodiments of the disclosure.

Referring to FIG. 12, the touch screen system 300 may include the touch screen panel 100, the touch screen controller 200, and a host 310. The structure and operations of the touch screen panel 100 and the touch screen controller 200 are the same as or similar to those described above with reference to FIGS. 1 through 11, and therefore, the descriptions of the elements 100 and 200 will be omitted.

The host 310 may be a processor which controls the operation of the touch screen controller 200. The host 310 may be implemented as an IC, a system-on-chip, an application processor (AP), or a mobile AP. The touch screen system 300 may be a mobile device, as described above with reference to FIG. 1, but the disclosure is not restricted to the current embodiments.

Figure 13:
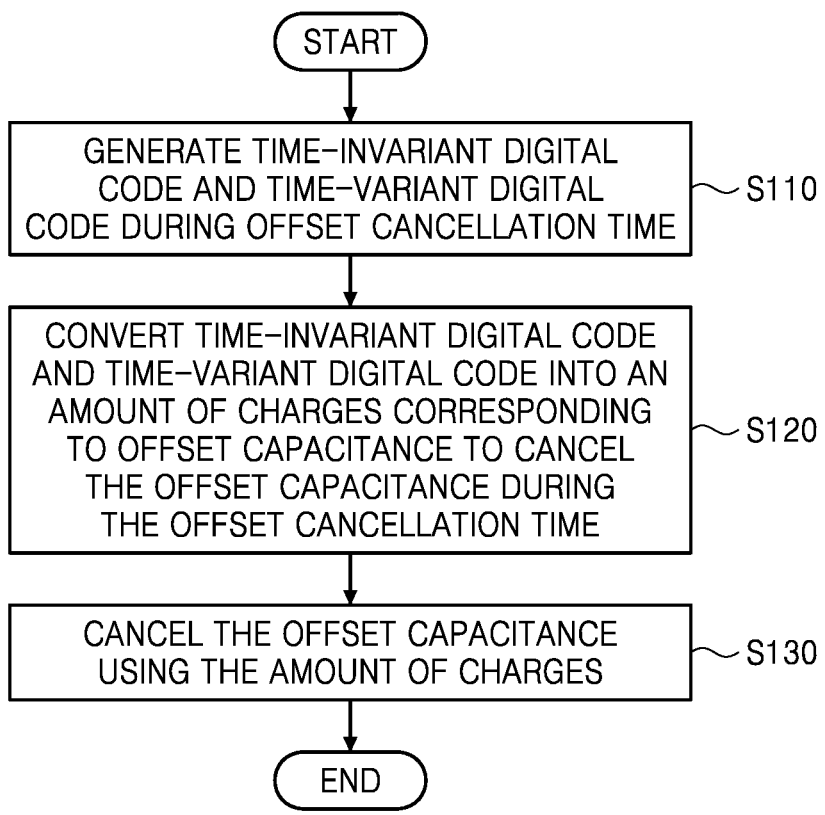
FIG. 13 is a flowchart of a method of operating a touch screen controller according to some embodiments of the disclosure.

FIG. 13 is a flowchart of a method of operating a touch screen controller according to some embodiments of the disclosure. Referring to FIGS. 1 through 13, the control logic circuit 240 of the touch screen controller 200 may generate and store the time-invariant digital code CCODE1 and the time-variant digital code TCODE1 in the memory 250 during an offset cancellation time (e.g., the calibration operation described with reference to FIG. 7) in operation S110. Alternatively, the control logic circuit 240 may read and transmit the time-invariant digital code CCODE1 and the time-variant digital code TCODE1 from the memory 250 to the first offset cancellation circuit 210-1 during an offset cancellation time (e.g., an offset cancellation time for processing the signal capacitance SIG described with reference to FIG. 11) in operation S110.

The switched-capacitor DAC 216 or the switched-capacitor array 216 may convert the time-invariant digital code CCODE1 and the time-variant digital code TCODE1 into the amount of electric charges corresponding to the offset capacitance COFF in order to cancel the offset capacitance COFF of the capacitive touch sensor 101 during the offset cancellation time in operation S120.

In other words, the switched-capacitor DAC 216 or the switched-capacitor array 216 may generate an offset cancellation capacitance for cancelling the offset capacitance COFF in response to the time-invariant digital code CCODE1 and the time-variant digital code TCODE1 during the offset cancellation time in operation S120.

The buffer 213, i.e., the capacitance-to-voltage converter 213 may convert a capacitance related with the node 203 into a voltage. The integrator 215, which can perform a plurality of integral operations, may integrate (or accumulate) output voltages of the buffer 213 and may cancel, in operation S130, a voltage corresponding to the offset capacitance COFF according to the integration (or accumulation) result. In other words, the offset cancellation circuit 210-1 may cancel the offset capacitance COFF using the amount of charges generated by the switched-capacitor DAC 216.

As described above, according to some embodiments of the disclosure, a touch screen controller cancels the offset capacitance of each of capacitive sensors included in a touch screen panel, thereby securing a signal dynamic range. As the size of an offset cancellation circuit included in the touch screen controller shrinks, the size of the touch screen controller also shrinks. The touch screen controller decreases the offset cancellation resolution of a touch screen panel below the capacitance of a unit capacitor implemented in the touch screen controller, thereby increasing the sensitivity of a touch or signal output from the touch screen panel.

In addition, the touch screen controller secures the linearity for cancelling an offset capacitance, thereby reducing a calibration time for cancelling the offset capacitance. The touch screen controller including an integrator adjusts the offset cancellation resolution according to the integration count of the integrator, thereby allowing manufacturers to design a unit capacitor without restriction on manufacturing processes.

Since the capacitance of a unit capacitor formed in the touch screen controller is greater than that of a minimum unit capacitor formed in a conventional touch screen controller and the number of unit capacitors formed in the touch screen controller is less than that of the minimum unit capacitors formed in the conventional touch screen controller, the touch screen controller decreases the number of control signals for controlling the unit capacitors and the number of switches relevant to the control signals as compared to the conventional touch screen controller.

As is traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

While the disclosure has been particularly shown and described with reference to exemplary embodiments thereof, it will be understood by those of ordinary skill in the art that various changes in forms and details may be made therein without departing from the spirit and scope of the disclosure as defined by the following claims.

What is claimed is:

1. A touch screen controller for cancelling an offset capacitance of a capacitive touch screen panel, the touch screen controller comprising:
a code generator configured to generate a time-invariant digital code and a time-variant digital code during an offset cancellation time; and
a switched-capacitor array configured to convert the time-invariant digital code and the time-variant digital code into an amount of electric charges corresponding to the offset capacitance to cancel the offset capacitance.

2. The touch screen controller of claim 1, wherein the time-invariant digital code controls a most significant bit (MSB) among bits corresponding to the offset capacitance and the time-variant digital code controls a least significant bit (LSB) among the bits.

3. The touch screen controller of claim 1, wherein the switched-capacitor array comprises:
a first switched-capacitor array configured to convert the time-invariant digital code into a first portion of the amount of the electric charges;
a second switched-capacitor array configured to convert the time-variant digital code into a second portion of the amount of the electric charges other than the first portion; and
a summation node configured to sum up the first portion and the second portion.

4. The touch screen controller of claim 3, wherein the first portion is greater than the second portion.

5. The touch screen controller of claim 3, wherein the second switched-capacitor array comprises a unit capacitor and the capacitance of the unit capacitor is greater than an offset cancellation resolution related with the offset capacitance.

6. The touch screen controller of claim 1, further comprising:
a capacitance-to-voltage converter configured to convert the amount of the electric charges into a voltage; and
an integrator connected to the capacitance-to-voltage converter.

7. The touch screen controller of claim 6, wherein an offset cancellation resolution of the offset capacitance cancelled by the time-variant digital code is related to an integration count of the integrator.

8. The touch screen controller of claim 6, wherein the switched-capacitor array comprises a plurality of unit capacitors and the amount of offset capacitance cancelled by the time-variant digital code at a time is determined according to the capacitance of one of the unit capacitors and an integration count of the integrator.

9. The touch screen controller of claim 8, further comprising:
an analog-to-digital converter configured to convert an output signal of the integrator into a digital code; and
a memory configured to store the time-invariant digital code and the time-variant digital code, wherein
the code generator is configured to store the time-invariant digital code and the time-variant digital code, which are determined when a reference digital code is the same as an output digital code of the analog-to-digital converter, in the memory.

10. The touch screen controller of claim 1, wherein the time-variant digital code is related to a charge count of at least one capacitor included in the switched-capacitor array.

11. A touch screen system comprising:
a capacitive touch screen panel including a touch sensor; and
a touch screen controller connected to the capacitive touch screen panel, wherein
the touch screen controller comprises:
a code generator configured to generate a time-invariant digital code and a time-variant digital code during an offset cancellation time; and
a switched-capacitor array configured to convert the time-invariant digital code and the time-variant digital code into an amount of electric charges corresponding to an offset capacitance of the touch sensor to cancel the offset capacitance.

12. The touch screen system of claim 11, wherein the time-invariant digital code includes a most significant bit (MSB) among bits corresponding to the offset capacitance and the time-variant digital code includes a least significant bit (LSB) among the bits.

13. The touch screen system of claim 11, wherein the switched-capacitor array comprises:
a first switched-capacitor array configured to convert the time-invariant digital code into a first portion of the amount of the charges;
a second switched-capacitor array configured to convert the time-variant digital code into a second portion of the amount of the charges other than the first portion; and
a subtraction circuit configured to subtract the sum of the first portion and the second portion from the offset capacitance.

14. The touch screen system of claim 13, wherein the second switched-capacitor array comprises a unit capacitor and the capacitance of the unit capacitor is greater than an offset cancellation resolution for cancelling the offset capacitance.

15. The touch screen system of claim 11, wherein the touch screen controller further comprises:

a capacitance-to-voltage converter configured to convert the amount of the electric charges into a voltage; and
an integrator connected to the capacitance-to-voltage converter.

16. The touch screen system of claim 15, wherein an offset cancellation resolution of the offset capacitance cancelled by the time-variant digital code is related to an integration count of the integrator.

17. The touch screen system of claim 15, wherein the switched-capacitor array comprises a plurality of unit capacitors and the amount of offset capacitance cancelled by the time-variant digital code at a time is determined according to the capacitance of one of the unit capacitors and an integration count of the integrator.

18. The touch screen system of claim 15, wherein the touch screen controller further comprises a driver configured to transmit a driving signal having as many pulse sequences as an integration count of the integrator to the touch sensor during the offset cancellation time.

19. A switched-capacitor digital-to-analog converter comprising:
a first switched-capacitor array configured to convert a time-invariant digital code input during an operating time into an amount of first charges;
a second switched-capacitor array configured to convert a time-variant digital code input during the operating time into an amount of second charges; and
a subtraction circuit configured to subtract a sum of the amount of the first charges and the amount of the second charges from a capacitance input through an input node.

20. The switched-capacitor digital-to-analog converter of claim 19, wherein the first switched-capacitor array comprises a plurality of switched-capacitors connected to the subtraction circuit, the second switched-capacitor array comprises at least one switched-capacitor connected to the subtraction circuit, a total capacitance of the plurality of switched-capacitors is controlled based on the time-invariant digital code related to a most significant bit (MSB) among bits corresponding to the capacitance input through the input node, and a total capacitance of the at least one switched-capacitor is controlled based on the time-variant digital code related to a least significant bit (LSB) among the bits.

* * * * *